US010140968B2

(12) United States Patent
Ayres

(10) Patent No.: US 10,140,968 B2
(45) Date of Patent: Nov. 27, 2018

(54) ACOUSTIC ABSORPTION AND METHODS OF MANUFACTURE

(71) Applicant: Ashmere Holdings Pty Ltd, Bayswater (AU)

(72) Inventor: Colin Ayres, Bayswater (AU)

(73) Assignee: Ashmere Holdings Pty Ltd, Bayswater WA (AU)

( * ) Notice: Subject to any disclaimer, the term of this patent is extended or adjusted under 35 U.S.C. 154(b) by 0 days.

(21) Appl. No.: 15/307,842

(22) PCT Filed: May 2, 2015

(86) PCT No.: PCT/AU2015/050210
§ 371 (c)(1),
(2) Date: Oct. 31, 2016

(87) PCT Pub. No.: WO2015/164929
PCT Pub. Date: Nov. 5, 2015

(65) Prior Publication Data
US 2017/0061949 A1    Mar. 2, 2017

(30) Foreign Application Priority Data

May 2, 2014    (AU) ................................ 2014901595

(51) Int. Cl.
*E04B 1/86*    (2006.01)
*G10K 11/168*    (2006.01)
(Continued)

(52) U.S. Cl.
CPC .......... *G10K 11/168* (2013.01); *B29D 24/005* (2013.01); *B29D 99/0089* (2013.01);
(Continued)

(58) Field of Classification Search
CPC .. G10K 11/168; G10K 11/172; B29D 24/005; B29D 99/0089; B32B 3/12;
(Continued)

(56) References Cited

U.S. PATENT DOCUMENTS 3,905,443 A    9/1975  Louis
4,097,633 A *  6/1978  Focht ...................... B32B 27/00
                                                              156/209

(Continued)

FOREIGN PATENT DOCUMENTS

DE    19813543 C2    5/2001
EP    2554091 A1     2/2013
(Continued)

OTHER PUBLICATIONS http://technologygateway.nasa.gov/docs/TOA_LARC21_CompositeHoneycomb_10web.pdf—NASA Langley'sMulti-Functional Composite and Honeycomb Panels.

*Primary Examiner* — Forrest M Phillips

(57) ABSTRACT

FIG. 2 shows a microperforated panel absorber 22 comprising: a microperforated facing 24; a non-perforated facing 26; and a cellular core structure 28 therebetween; the core structure 28 provides a number of primary cells 33 and a number of secondary cells 37; the secondary cells 37 each provide a reduced cell depth in comparison to the primary cells 33. FIG. 9 shows that the number of the primary cells 33 and the number of the secondary cells 37 ensures that sound absorption at frequencies up to and including the peak frequency is substantially maintained and that the sound absorption at frequencies higher than peak frequency is substantially increased relative to a comparable panel absorber in which the secondary cells are effectively replaced by primary cells.

5 Claims, 16 Drawing Sheets

(51) Int. Cl.
*G10K 11/172* (2006.01)
*B29D 99/00* (2010.01)
*B32B 37/14* (2006.01)
*B29D 24/00* (2006.01)
*B32B 3/12* (2006.01)
*B32B 3/26* (2006.01)
*E04B 1/84* (2006.01)

(52) U.S. Cl.
CPC .............. *B32B 3/12* (2013.01); *B32B 3/266* (2013.01); *B32B 37/146* (2013.01); *E04B 1/86* (2013.01); *G10K 11/172* (2013.01); *B32B 2307/102* (2013.01); *B32B 2607/00* (2013.01); *E04B 2001/8471* (2013.01); *E04B 2001/8485* (2013.01)

(58) Field of Classification Search
CPC ............ B32B 27/146; B32B 2307/102; B32B 2607/00; E04B 1/86; E04B 2001/8471; E04B 2001/8485
USPC .................................... 181/292, 290, 284
See application file for complete search history.

(56) References Cited

U.S. PATENT DOCUMENTS

| | | | |
|---|---|---|---|
| 4,248,647 A * | 2/1981 | Herron | B29C 63/02 156/219 |
| 4,585,685 A * | 4/1986 | Forry | E04B 1/8409 156/62.8 |
| 4,645,032 A | 2/1987 | Ross et al. | |
| 6,179,086 B1 * | 1/2001 | Bansemir | G10K 11/172 181/198 |
| 6,220,388 B1 | 4/2001 | Sanborn | |
| 6,290,022 B1 * | 9/2001 | Wolf | G10K 11/172 181/286 |
| 6,983,821 B2 | 1/2006 | Putt et al. | |
| 7,434,659 B2 * | 10/2008 | Ayle | F02C 7/045 181/284 |
| 7,631,727 B2 * | 12/2009 | Thomas | B32B 3/10 181/288 |
| 8,336,804 B2 * | 12/2012 | Hoetzeldt | B32B 3/08 181/288 |
| 8,474,574 B1 | 7/2013 | Kobayashi et al. | |
| 2003/0066708 A1 * | 4/2003 | Allison | B32B 5/18 181/290 |
| 2004/0163888 A1 | 8/2004 | Johnson | |
| 2010/0148001 A1 | 6/2010 | Hoetzeldt et al. | |
| 2012/0155688 A1 | 6/2012 | Wilson | |
| 2012/0205192 A1 | 8/2012 | Bornert-Dano | |
| 2012/0317782 A1 | 12/2012 | Porte et al. | |

FOREIGN PATENT DOCUMENTS

| | | |
|---|---|---|
| FR | 2940360 | 10/2011 |
| GB | 2109902 B | 6/1983 |
| JP | 200570562 | 3/2005 |
| JP | 2007106304 | 4/2007 |
| KR | 2007001040 | 1/2007 |
| RU | 2011116525 | 11/2012 |
| WO | 2012164189 A1 | 12/2012 |

* cited by examiner

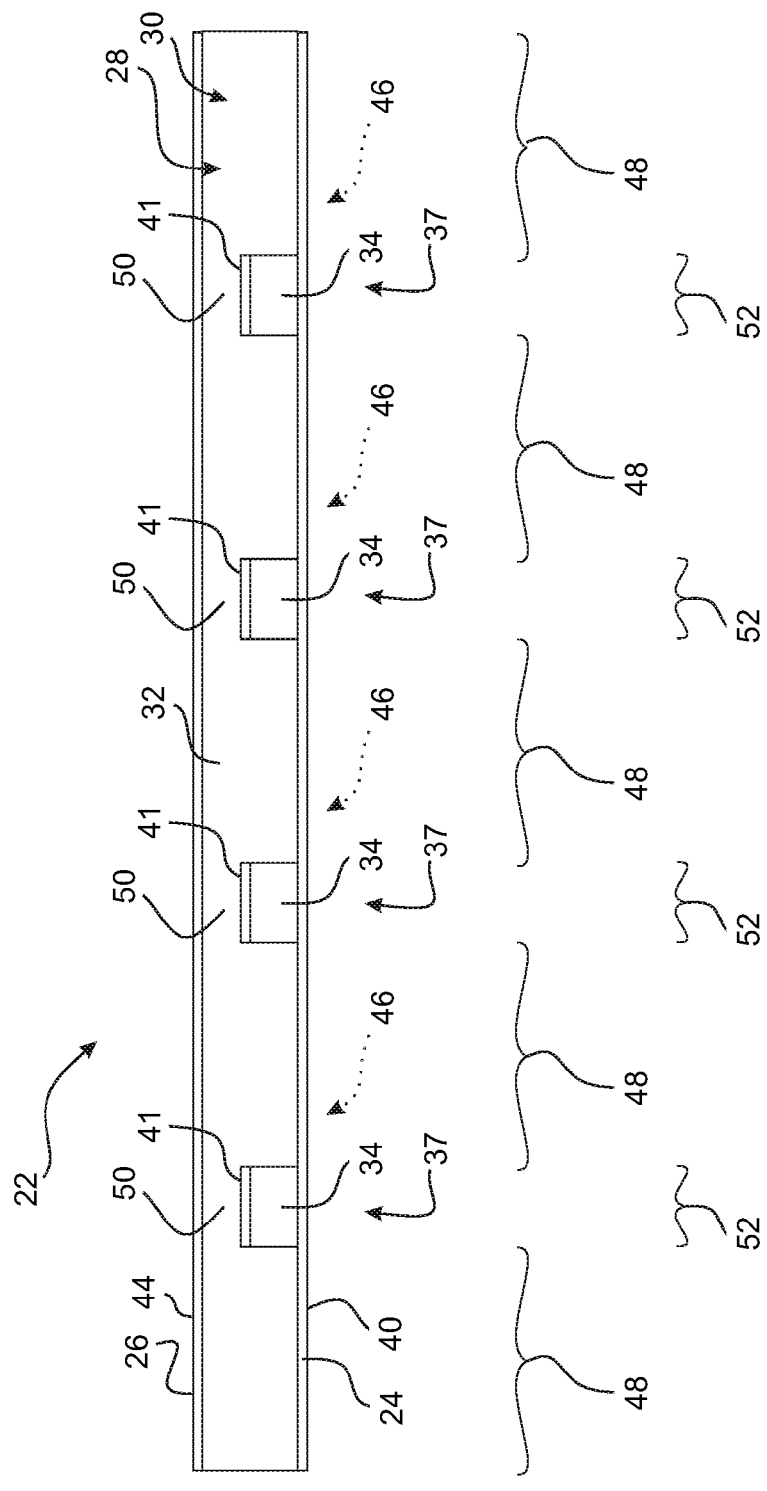

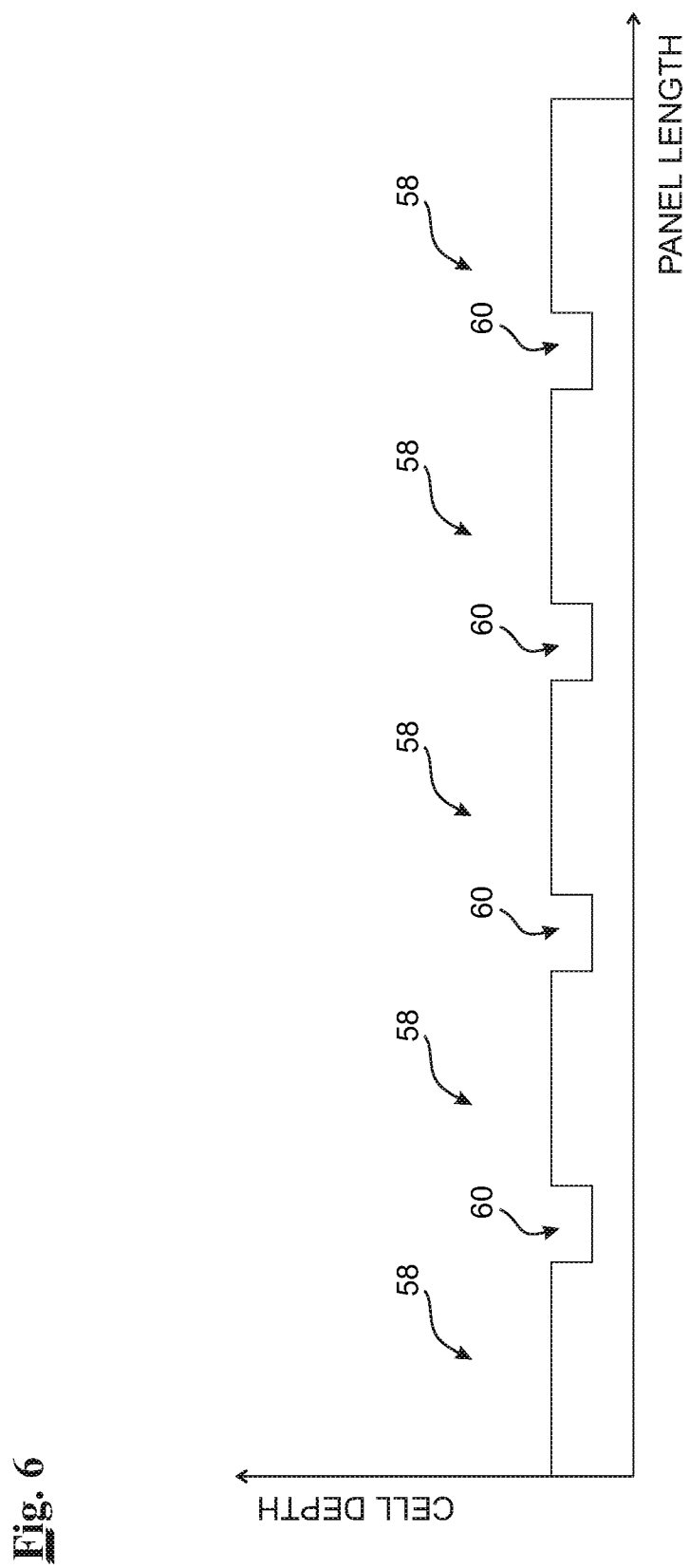

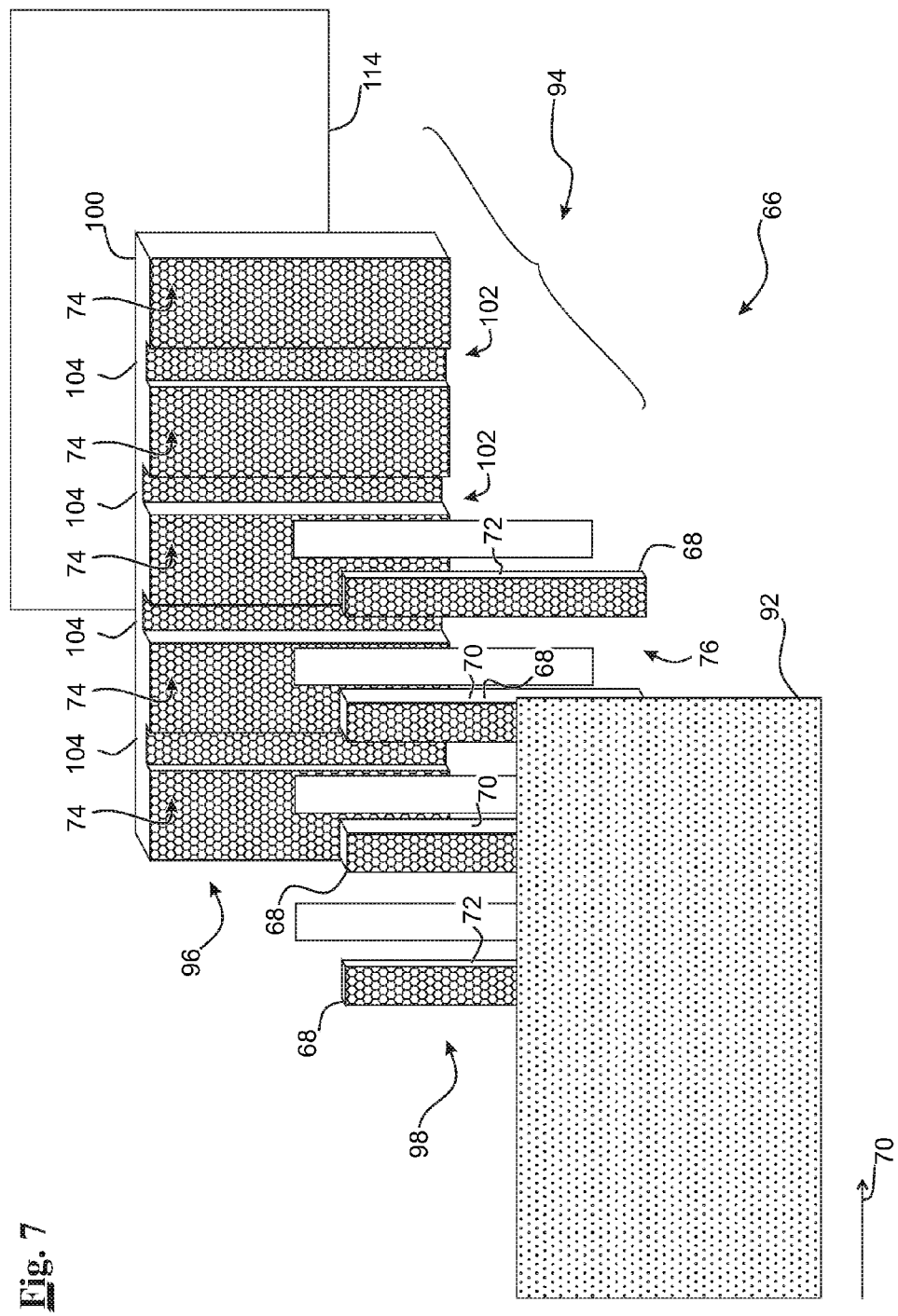

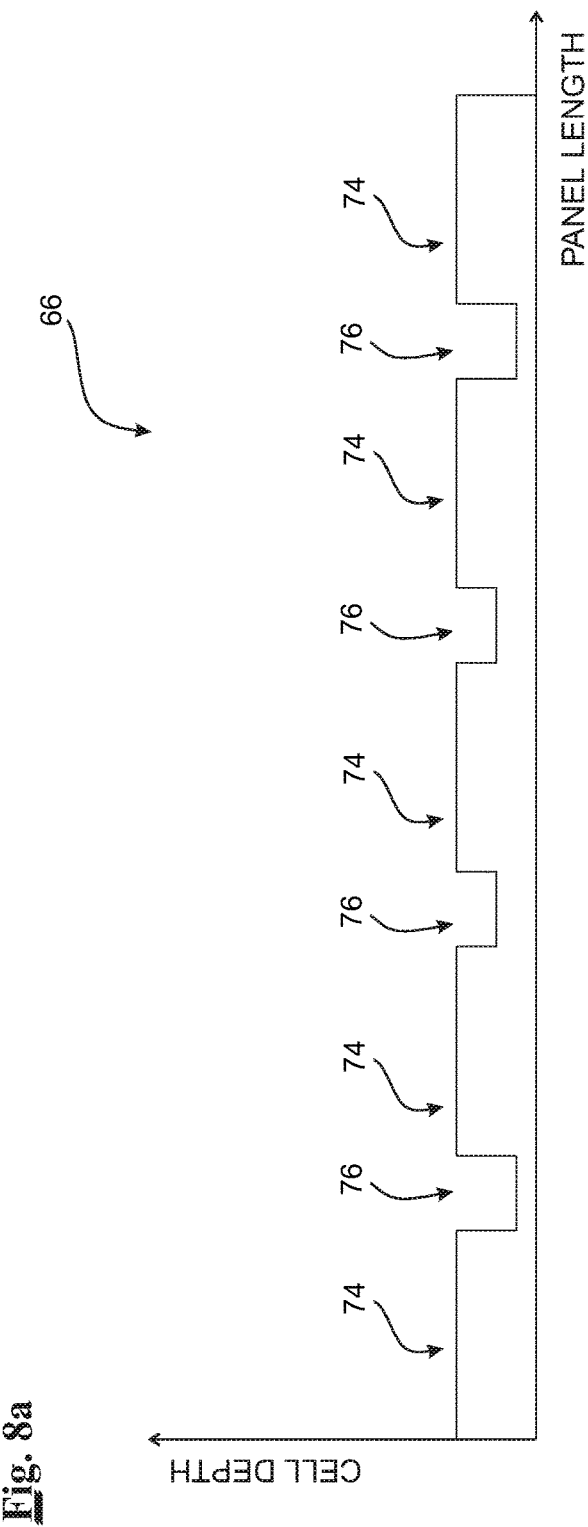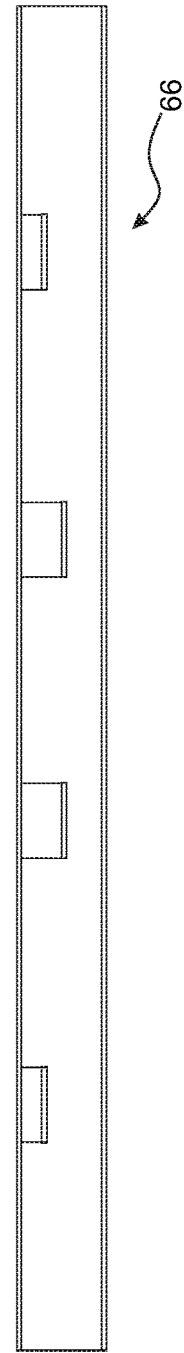

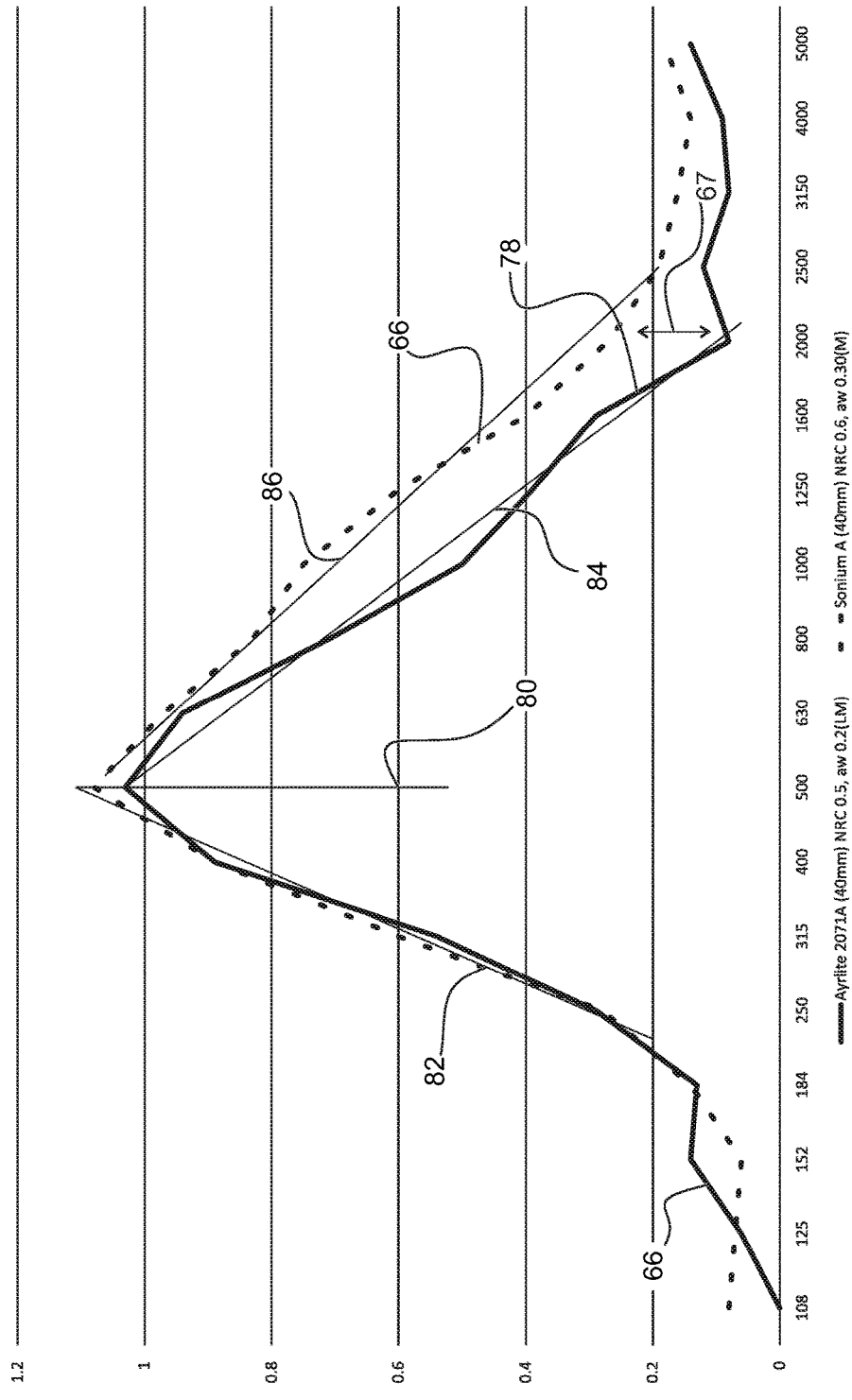

ACOUSTIC ABSORPTION AND METHODS OF MANUFACTURE

This application claims priority under 35 U.S.C. § 371 to application no. PCT/AU2015/050210, filed on May 2, 2015, and content of which is hereby incorporated by reference in its entirety.

FIELD OF THE INVENTION

The present invention relates to panels for acoustic absorption and methods of manufacture.

The present application claims priority from Australian provisional application AU2014901595 filed 2 May 2014 and entitled 'ACOUSTIC ABSORPTION AND METHODS OF MANUFACTURE'. The entire disclosure of 2014901595 is hereby incorporated by reference for all purposes.

BACKGROUND To THE INVENTION

It is possible to provide an acoustic absorption panel in a form having: (i) a microperforated facing; (ii) a non-perforated backing; and (iii) a cellular core structure extending from the microperforated facing to the non-perforated backing.

Panels of this form provide 'microperforated panel absorbers' and may find application as internal walls, ceilings, and partitions in aircraft, ships, trains and buildings. Other applications include use in machinery enclosures.

The microperforated facing could be provided with a number of punched openings, having a diameter of say 0.5 to 1 mm. The cellular core structure could be provided as a hexagonal honeycomb-type array of cells.

By employing microperforated panel absorbers, advantageous acoustic absorption can be provided, without the use of any fibrous materials. Acoustic absorption can be provided at relatively low frequencies and at relatively low weight, which is difficult to achieve with conventional fibrous materials.

The cell depth of the cellular core structure has a profound effect on the acoustic frequencies that can be absorbed. Deep cell depths absorb relatively low frequencies, whereas shallow cell depths absorb relatively high frequencies.

Microperforated panel absorbers are usually highly effective over a relatively narrow waveband corresponding to their cell depth.

It would be advantageous to provide an acoustic absorption panel having improved absorption characteristics, or to at least provide the public with a useful choice.

SUMMARY OF THE INVENTION

According to a first aspect of preferred embodiments herein described there is provided a microperforated panel absorber comprising: a microperforated facing; a substantially non-perforated backing; and a cellular core structure therebetween; the cellular core structure providing a number of primary cells and a number of secondary cells; the secondary cells each providing a reduced cell depth in comparison to the primary cells.

Preferably the primary cells extend from the microperforated facing to the substantially non-perforated backing. The substantially non-perforated backing preferably comprises a non-perforated backing.

Preferably the secondary reduced depth cells extend from the microperforated facing to a substantially non-perforated intermediate boundary member that is located between the microperforated facing and the substantially non-perforated backing. Preferably the boundary member comprises a membrane.

Preferably the microperforated facing, the substantially non-perforated backing and the intermediate boundary member each comprise planar sheets. Preferably the cells of the cellular core structure are adhered to the planar sheets using an adhesive.

Preferably the number of the primary cells and the number of the secondary reduced depth cells ensures that sound absorption is substantially maintained at low frequencies up to and including the peak absorption frequency, and improved at higher frequencies up to four times the peak frequency, relative to a comparable panel absorber in which the secondary cells are effectively replaced by primary cells.

Preferably the sound absorption between the peak frequency and four times the peak frequency is substantially increased due to the presence of the secondary reduced depth cells, relative to a comparable panel absorber in which the secondary cells are effectively replaced by primary cells.

Preferably the primary cells provide a primary cell depth and the secondary cells provide a secondary reduced cell depth equal to or less than about 50% of the primary cell depth.

Preferably the primary cells provide a primary cell depth and the secondary cells provide a secondary reduced cell depth of about 50% of the primary cell depth.

Preferably the primary cells provide a primary cell depth and the secondary cells provide a secondary reduced cell depth of about 25% of the primary cell depth.

Preferably the primary cells provide a primary cell depth and the secondary cells provide: (i) cells having a secondary reduced cell depth of about 50% of the primary cell depth; and (ii) cells having a secondary reduced cell depth of about 25% of the primary cell depth.

Preferably the primary cells provide a primary cell depth and the secondary cells have depths from 25% to 50% of the primary cell depth.

Preferably the primary cells and the secondary cells are each of the same general shape and size in cross-section. Preferably the primary cells and the secondary cells are substantially hexagonally shaped.

Preferably the core structure provides precisely one primary and one reduced cell depth.

Preferably the core structure provides precisely one primary and two different reduced cell depths.

Preferably 30 to 50% of the acoustic absorption area provided by the microperforated panel absorber is provided by the secondary cells.

Preferably 30 to 40% of the acoustic absorption area provided by the microperforated panel absorber is provided by the secondary cells.

Preferably 40 to 50% of the acoustic absorption area provided by the microperforated panel absorber is provided by the secondary cells.

Preferably the remaining acoustic absorption area provided by the microperforated panel absorber is provided by the primary cells.

Preferably the primary cells are provided by a first section of the cellular core structure; the first section being continuous; and the secondary reduced depth cells are provided by one or more second sections embedded into the continuous first section of the cellular core structure. Preferably the first section comprises a continuous honeycomb-type core structure.

Preferably the second sections are embedded into the continuous first section of the core structure and extend from the microperforated facing into the body of the panel.

Preferably the second sections are accommodated by crushing portions of the first section to provide recesses that accommodate the second sections. In other embodiments, the second sections are accommodated by cutting out portions of the first section.

Preferably each second section comprises a cellular core structure having a substantially non-perforated boundary member on its rear face. The substantially non-perforated boundary member is preferably non-perforated. Preferably the boundary member provides a membrane.

Preferably the front of the cell structure is adhered to the microperforated facing, with generally minimal blocking of microperforations, and the membrane is adhered to the underlying first section of the cellular core structure.

Preferably the primary cells are provided by a number of primary areas of the cellular core structure; and the secondary reduced depth cells are provided by a number of secondary areas of the cellular core structure.

Preferably the secondary areas are provided as one or more strips extending across the panel.

Preferably the secondary reduced-depth cells provide one or more different cell depths. In the acoustic panel this preferably provides a variety of Helmholtz type cavity depths for broadband sound absorption.

Preferably the weighted average sound coefficient is advantageously increased in embodiments. In these embodiments, the weighted sound absorption coefficient is preferably substantially increased, relative to a comparable panel absorber in which the secondary cells are effectively replaced by primary cells.

The number of the primary cells and the number of the secondary reduced depth cells may ensure that sound absorption is substantially maintained at low frequencies up to and including the peak absorption frequency, relative to a comparable panel absorber in which the secondary cells are effectively replaced by primary cells.

The number of the primary cells and the number of the secondary cells may ensure that the sound absorption between half the peak frequency and the peak frequency is substantially maintained and that the sound absorption between the peak frequency and four times the peak frequency is substantially increased, relative to a comparable panel absorber in which the secondary cells are effectively replaced by primary cells.

According to a second aspect of preferred embodiments herein described there is provided a microperforated panel absorber comprising: a microperforated facing; a substantially non-perforated backing; and a cellular core structure; the cellular core structure providing primary cells of a primary cell depth and secondary cells of at least one secondary cell depth; the primary cells providing acoustic absorption of relatively low frequencies; the or each secondary cell depth being less than the primary cell depth; the secondary cells providing acoustic absorption of relatively high frequencies; wherein the cells of the at least one secondary reduced cell depth cover one third to one half of the acoustic absorption area of the microperforated panel absorber.

Preferably the cells of the at least one secondary cell depth cover about one third of the acoustic absorption area of the microperforated panel absorber.

Preferably the peak absorption frequency of the panel is 500 Hz, the peak absorption frequency being provided by the primary cells.

Preferably the acoustic absorption area is substantially equal to the full outward area of the microperforated facing; the acoustic absorption area being the total absorption area of the microperforated facing covering the cells of the core structure.

Some embodiments may advantageously increase the weighted average sound coefficient. In these embodiments, the weighted sound absorption coefficient is preferably substantially increased, relative to a comparable panel absorber in which the secondary cells are effectively replaced by primary cells. Preferably the weighted sound absorption coefficient is increased by at least 1.5 times, relative to a comparable panel absorber in which the secondary cells are effectively replaced by primary cells.

Preferably the weighted sound absorption coefficient is doubled, relative to a comparable panel absorber in which the secondary cells are effectively replaced by primary cells.

Preferably the acoustic absorption area provided by the primary cells is less than 70% of the acoustic absorption area of the microperforated panel.

Preferably the primary cells and the secondary cells are provided in groups. Preferably each cell in each group has the same cell depth.

Preferably the noise reduction coefficient is increased, relative to a comparable panel absorber in which the secondary cells are effectively replaced by primary cells.

The noise reduction coefficient may be increased by 0.05 or more, relative to a comparable panel absorber in which the secondary cells are effectively replaced by primary cells. Notably NRC values are only measured in 0.05 increments. The noise reduction coefficient may be increased by 0.10 or more, relative to a comparable panel absorber in which the secondary cells are effectively replaced by primary cells.

The sum of the sound absorption coefficients at half the peak frequency, the peak frequency, double the peak frequency, and four times the peak frequency may be substantially increased, relative to a comparable panel absorber in which the secondary cells are effectively replaced by primary cells. The sum of the sound absorption coefficients at half the peak frequency, the peak frequency, double the peak frequency, and four times the peak frequency may be increased by 10% or more, relative to a comparable panel absorber in which the secondary cells are effectively replaced by primary cells. The sum of the sound absorption coefficients at half the peak frequency, the peak frequency, double the peak frequency, and four times the peak frequency may be increased by 15% or more, relative to a comparable panel absorber in which the secondary cells are effectively replaced by primary cells. The sum of the sound absorption coefficients at half the peak frequency, the peak frequency, double the peak frequency, and four times the peak frequency may be increased by 20% or more, relative to a comparable panel absorber in which the secondary cells are effectively replaced by primary cells.

The sound absorption coefficients from the peak frequency to four times the peak frequency may be substantially increased, relative to a comparable panel absorber in which the secondary cells are effectively replaced by primary cells.

The sound absorption coefficients from half the peak frequency to the peak frequency may be substantially maintained, relative to a comparable panel absorber in which the secondary cells are effectively replaced by primary cells.

In some embodiments, the average sound absorption coefficient from half the peak frequency to the peak frequency may be reduced by less than 5% relative to a comparable panel absorber in which the secondary cells are effectively replaced by primary cells. The average sound absorption coefficient from half the peak frequency to the peak frequency may be reduced by less than 3% relative to a comparable panel absorber in which the secondary cells are effectively replaced by primary cells. The sum of the sound absorption coefficients at half the peak frequency and the peak frequency may be reduced by less than 5% relative to a comparable panel absorber in which the secondary cells are effectively replaced by primary cells. The sum of the sound absorption coefficients at half the peak frequency and the peak frequency may be reduced by less than 3% relative to a comparable panel absorber in which the secondary cells are effectively replaced by primary cells.

According to a third aspect of preferred embodiments herein described there is provided a method of providing a microperforated panel absorber comprising: providing a primary cellular core having a number of primary cells; crushing one or more portions of the primary cellular core to provide a number of recesses; providing secondary cells in the recesses; the secondary cells being of reduced depth in comparison to the primary cells; the primary cells providing for absorption of relatively low frequencies; and the secondary cells of reduced depth providing for absorption of relatively high frequencies.

Preferably crushing the primary cellular core is performed using a secondary reduced depth cellular core having a higher compression strength than the primary cellular core that is crushed. Preferably the secondary reduced depth cellular core comprises a series of sections of cellular core.

Preferably the secondary reduced depth cellular core of higher compression strength includes a substantially non-perforated boundary member that contacts and crushes the primary cellular core. Preferably the substantially non-perforated boundary member comprises a non-perforated membrane.

According to a fourth aspect of preferred embodiments herein described there is provided a method of providing a microperforated panel absorber comprising: providing a primary cellular core having a number of primary cells; cutting one or more portions of the primary cellular core to provide a number of recesses; providing secondary cells in the recesses; the secondary cells being of reduced depth in comparison to the primary cells; the primary cells for providing absorption of relatively low frequencies; and the secondary cells of reduced depth for providing absorption of relatively high frequencies.

According to a fifth aspect of preferred embodiments herein described there is provided a method of providing a microperforated panel absorber comprising: providing a cellular core structure having a number of cells of a primary cell depth; and providing a number of recesses in the core structure; the method including providing for or otherwise accommodating a number of secondary cells of reduced cell depth in the recesses.

According to a sixth aspect of preferred embodiments herein described there is provided a microperforated panel absorber comprising: a front sheet, a rear sheet and a core structure therebetween; the front sheet having microperforations; the rear sheet being non-perforated; the core structure having primary cells of a primary cell depth and secondary cells each providing a reduced cell depth; the microperforations in the front sheet providing acoustic passages extending into the cells provided by the core structure; the primary cell depths providing absorption of relatively low frequencies; the secondary cell depths each being less than the primary depths for providing absorption of relatively high frequencies.

Preferably the surface area of the microperforated front sheet overlying the secondary cells is at least 20% of the surface area of the front sheet.

Preferably the surface area of the microperforated front sheet overlying the secondary cells is at least 30% of the surface area of the front sheet.

Preferably the surface area of the microperforated front sheet overlying the secondary cells is between 25 to 50% of the surface area of the front sheet.

Preferably the surface area of the front sheet overlying the secondary cells is about one third of the surface area of the front sheet.

Preferably providing a number of recesses in the core structure comprises compressing one or more sections of the core structure with one or a series of elements.

Various preferred embodiments of the present invention provide microperforated panel absorbers having one or more embedded sections. The embedded sections provide at least one reduced cell depth associated with at least one relatively high frequency absorption waveband. The microperforated panel is thereby provided with relatively broadband frequency absorption characteristics while advantageously substantially maintaining both peak frequency and low frequency absorption.

Preferred embodiments of the present invention substantially increase absorption bandwidth by the use of varying cell depths in the same unitary panel construction.

It is to be recognised that other aspects, preferred forms and advantages of the present invention will be apparent from the present specification including the detailed description, drawings and claims.

There is no intention to limit the present invention to the specific embodiments shown in the drawings. The present invention is to be construed beneficially to the applicant and the invention given its full scope.

BRIEF DESCRIPTION OF DRAWINGS

In order to facilitate a better understanding of the present invention, several preferred embodiments will now be described with reference to the accompanying drawings as detailed below.

FIG. 4 provides a side schematic view of the microperforated panel absorber shown in FIG. 2.

FIG. 6 provides a graph representing cell depth along the microperforated panel absorber shown in FIG. 2.

FIG. 7 provides an exploded schematic view of a microperforated panel absorber according to a second preferred embodiment of the present invention.

FIG. 8 provides a graph representing cell depth along the microperforated panel absorber shown in FIG. 7.

FIG. 9 provides a chart illustrating the performance of the microperforated panel absorber shown in FIG. 8.

DETAILED DESCRIPTION OF THE EMBODIMENTS

It is to be appreciated that each of the embodiments is specifically described and that the present invention is not to be construed as being limited to any specific feature or element of any one of the embodiments. Neither is the present invention to be construed as being limited to any feature of a number of the embodiments or variations described in relation to the embodiments.

Figure 1:
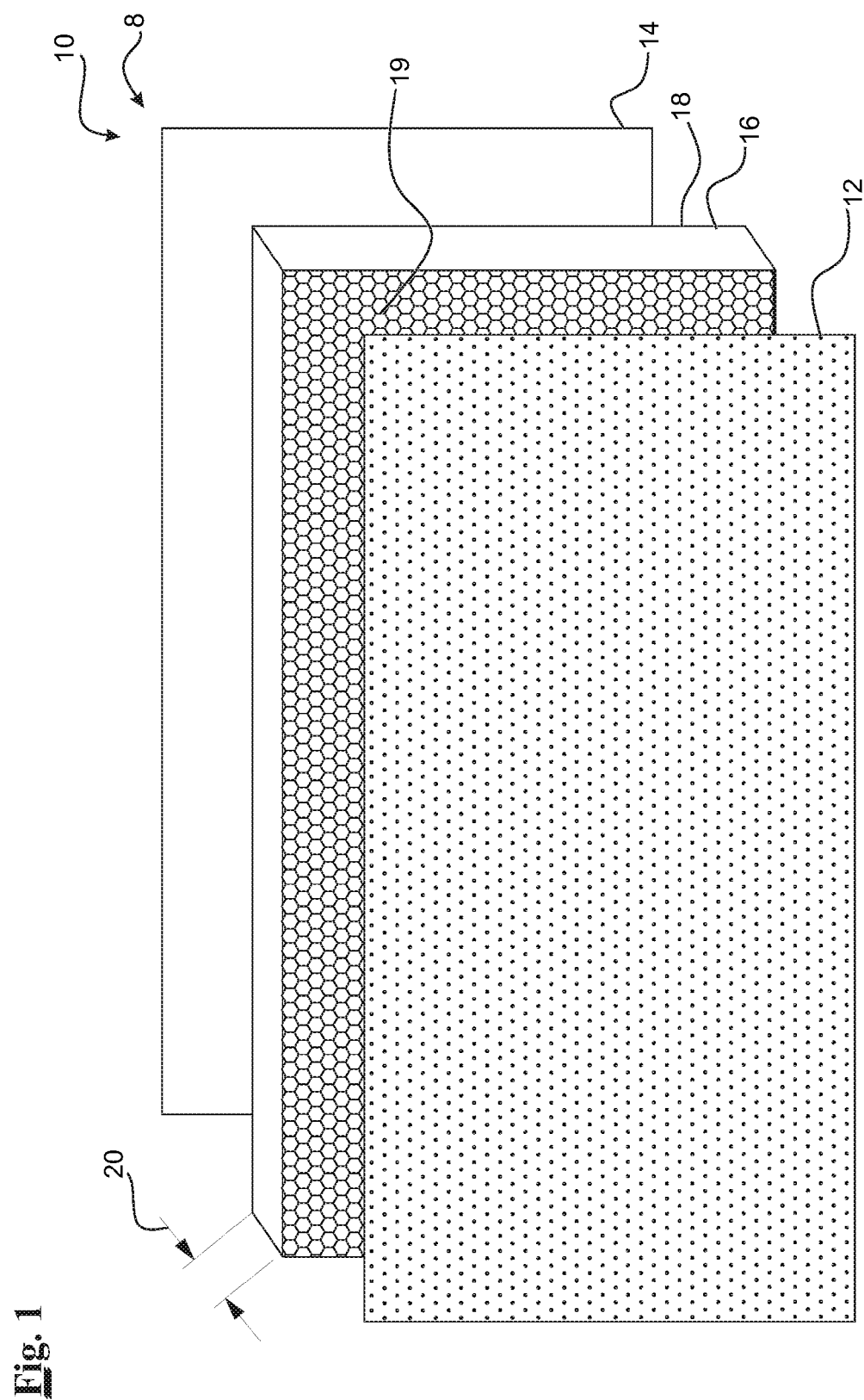
FIG. 1 provides an exploded schematic view of a microperforated panel absorber (background).

FIG. 1 provides an exploded schematic view of an existing microperforated panel 8, providing a microperforated panel absorber 10. The microperforated panel absorber 10 includes a microperforated sheet 12, a non-perforated rear sheet 14 and a core structure 16 therebetween. The core structure 16 is provided as a cellular honeycomb core 18 having hexagonally shaped cells 19 of a cell depth 20. The cellular honeycomb core 18 is adhered to the microperforated sheet 12 and the solid rear sheet 14. The microperforations, cell size and cell depth provide a microperforated panel absorber having a peak absorption frequency of 500 Hz.

Figure 2:
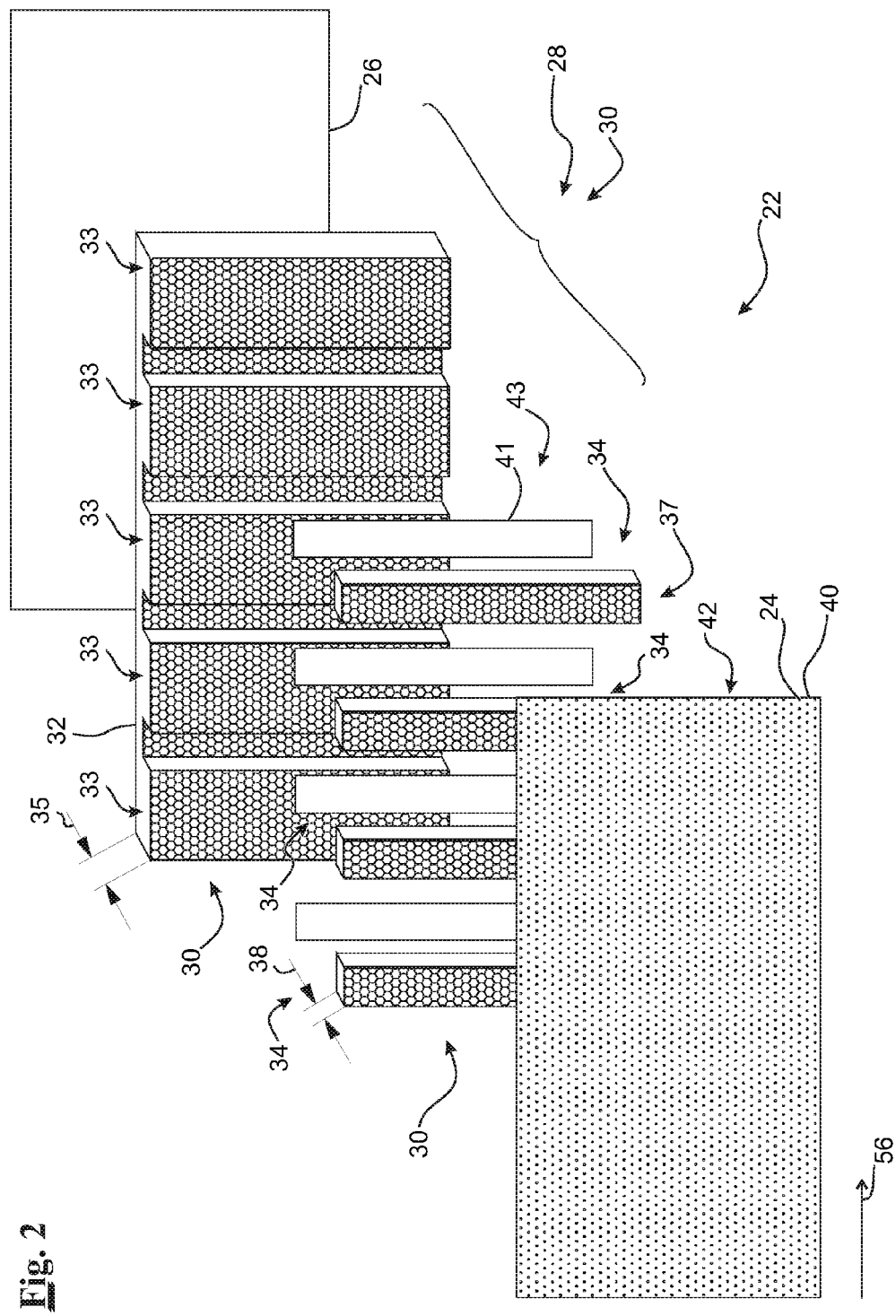
FIG. 2 provides an exploded schematic view of a microperforated panel absorber according to a first preferred embodiment of the present invention.

FIG. 2 provides an exploded schematic view of a microperforated panel absorber 22 according to a first preferred embodiment of the present invention. In comparison to the microperforated panel absorber 10, the microperforated panel absorber 22 is considered to advantageously provide relatively broad frequency absorption without substantially sacrificing the low frequency absorption qualities of the panel.

The microperforated panel absorber 10 is considered to constitute a comparable microperforated panel absorber to the microperforated panel absorber 22 for reasons discussed in further detail below.

The microperforated panel absorber 22 includes a panel facing 24 and a panel backing 26. The panel facing 24 is microperforated. The panel backing 26 is non-perforated. A core structure 28 is sandwiched between the panel facing 24 and the panel backing 26. The core structure 28 comprises a honeycomb core structure 30 having a number of cells 30. The core structure 28 comprises a first section 32 and four second sections 34. The first section 32 of the core structure 28 provides a number of primary cells 33 each having a first cell depth 35. The second sections 34 of the core structure 28 provide a number of secondary cells 37 each having a second cell depth 38.

The microperforated panel absorber 10 constitutes a comparable panel absorber to the micro panel absorber 22. The panels are generally equivalent in structure and materials apart from matters related to the presence of the secondary cells 37. In the comparable panel absorber 10 the secondary cells 37 are effectively replaced by primary cells.

The secondary cells 37 each provide the second cell depth 38 as a reduced cell depth, in comparison to the first cell depth 35. The secondary cells 37 have a hexagonal cross section. The secondary cells 37 are the same general size and shape as the primary cells 33. The secondary cells 37 have a higher compression strength than the primary cells 33. This is discussed in further detail below.

Figure 3B:
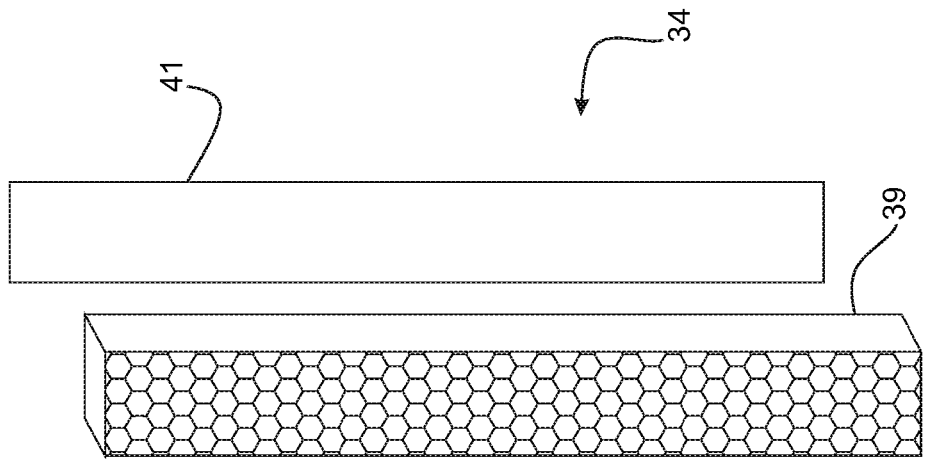
FIG. 3a and FIG. 3b respectively provide a perspective schematic view and a perspective exploded view of a section of the microperforated panel absorber used in the panel shown in FIG. 2.
Figure 3A:
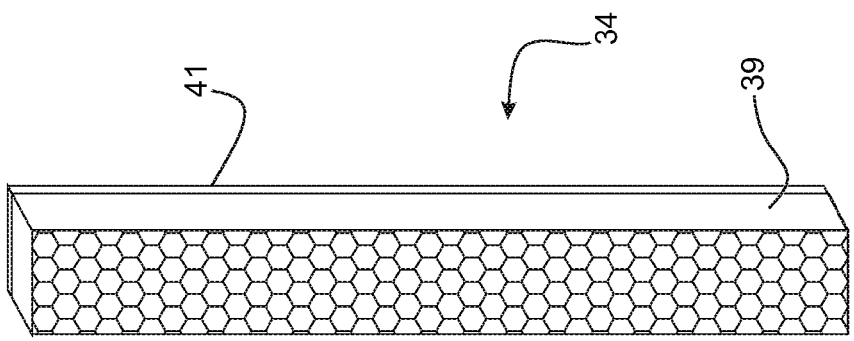

As illustrated in FIGS. 3a and 3b, each of the second sections 34 includes a core structure 39 and a non-perforated backing 41. The core structure 39 is about one half the first cell depth 35 and the facing 41 is fixed to the core structure 39 using an adhesive. This provides each second section 34 as a unitary section. The second sections 34 are provided in the first section 32 to form the core 28.

The backings 41 as a group provide an intermediate boundary member 43 that is located between the panel facing 24 and the panel backing 26.

As would be apparent the primary cells 33 extend from panel facing 24 to the panel backing 26. The secondary cells 37 extend from the panel facing 24 to the boundary member 43. In order to provide the secondary cells 37 as Helmholtz type resonators, the intermediate backings 41 are non-perforated. Each backing 41 provides a membrane.

The panel facing 24 comprises a flat sheet 40 having microperforations in the form of openings 42. The openings 42 provide passages into the cells 30. The flat sheet 40 comprises a sheet of aluminium material. In other embodiments the flat sheet could of course be steel or plastic otherwise. The openings 42 are punched through the sheet 40. A suitable density of holes is chosen such that, on average, there is provided at least one hole per cell. In some embodiments the openings are arranged at 60 degrees (reflecting the hexagonal structure underneath), or 90 degrees (square pattern).

The openings 42 provide the panel facing 24 as a microperforated sheet 40 having openings for the primary cells 33 and the secondary cells 37.

The openings 42 in the embodiment are about 0.8 mm in diameter. Various openings could be provided such those as ranging between 0.5 to 1 mm. In this embodiment the total open area of the openings is less than 1% of the outwardly facing sheet area of the microperforated panel facing 24.

The panel backing 26 provides a flat sheet 44 that that is non-perforated. The presence of the microperforated sheet 40 and non-perforated sheet 44 provides an array of Helmhotz-type absorbers.

FIG. 3a provides a top view of the microperforated panel absorber 22. FIG. 3b provides an exploded top view of the core structure 28. As shown, the first section 32 comprises a body having a number of recesses 46 that each receive a respective second section 34. The first section 32 extends the length of the microperforated panel absorber 22. The recesses 46 are positioned in series along the first section 32. The recesses 46 are equally spaced apart and divide the first section 32 into five first zone portions 48. The five zone portions 48 are of the same size. The five zone portions 48 are separated by a number of joining portions 50 of the core structure 30. The joining portions 50 comprise crushed portions and do not provide acoustic absorption. The joining portions 50 serve to space apart a number of groupings of the primary cells 33.

The recesses 46 receive the second sections 34. The second sections 34 provide a number of second zone portions 52. The first zone portions 48 and the second zone portions 52 abut the first sheet 24 to provide for advantageous sound absorption. The first zone portions 48 comprise the thicker portions of the first section 32. The first section 32 is of a thickness providing a cell depth of about 40 mm with the recesses 46 occupying half the 40 mm depth. The joining portions 50 are consequently about 20 mm or half the thickness of the primary cell depth.

The joining portions 50 are provided by compressing the first section 32 to provide the recesses 46. The first section 32 is originally provided as a rectangular block without any of the recesses. The first section 32 is provided as a foil based honeycomb structure 30 having a 50 micron wall thickness. The second sections 34 have a higher compression strength than the first section 32 to allow for ready compression of the first section 32. The second sections 34 comprise thicker core wall material than the first section 32. In the embodiment the wall thickness of the second sections 34 is about 75 microns. The second sections 34 are also provided as a foil based honeycomb structure.

The cells 30 of the first section 32 and the second sections 34 are of the same hexagonal cell size.

During manufacture the second sections 34 are forced into the first section 32 with a press arrangement. The ability to readily provide the recesses 46 by crushing the spaced apart sections 34 into the first section 32, using the second sections 34 of a higher compression strength, is considered to be advantageous.

The first section 32 is continuous with a length and width corresponding to length and width of the panel 22. The recesses 46 do not extend fully through the first section 32. The provision of a continuous first section 32 is considered to be advantageous. The panel 22 is provided as a single unitary panel.

Figure 5:
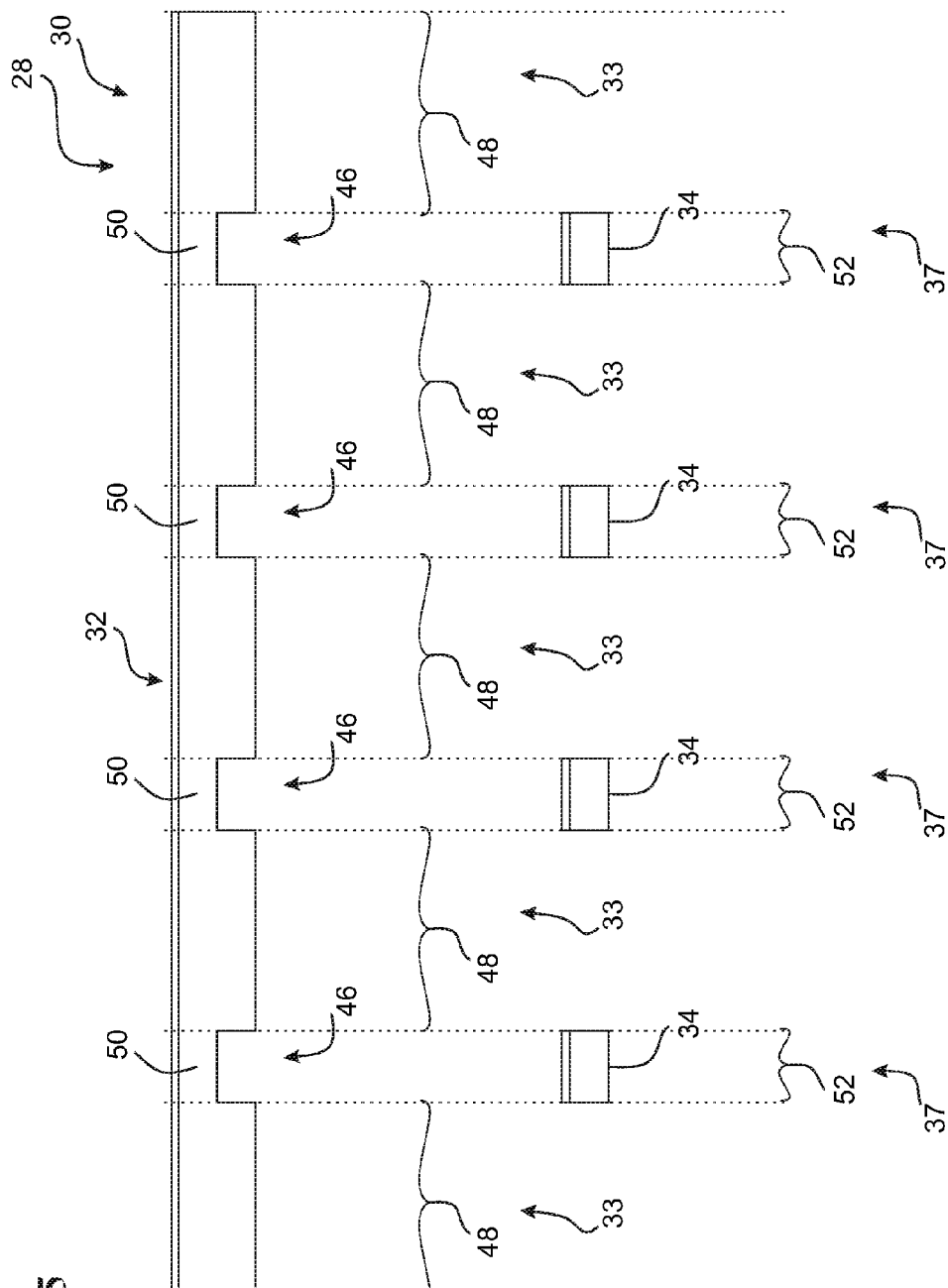
FIG. 5 provides a side exploded schematic view of the core structure of the microperforated panel absorber shown in FIG. 2.

Returning to FIG. 5, the primary cells 33 are associated with the first zone portions 48 (facing the panel facing 40), have a depth of 40 mm and are associated with a resonant frequency of 500 Hz. The secondary cells 37 are associated with the second zone portions 52, have a depth of 20 mm (half the first cell depth) and are associated with a higher resonant frequency. The provision of primary cells 33 for a first relatively low frequency and secondary cells 37 for a second relatively high frequency is considered to be advantageous.

FIG. 6 provides a chart illustrating the cell depth along the panel 22 (i.e. direction 56 shown in FIG. 2). The cell depth varies in an alternating manner as shown. Bands 58 and bands 60 alternate in series along the length of the panel 22.

FIG. 7 illustrates a panel 66 according to another preferred embodiment of the present invention. The panel 66 has similar components to the panel 22 and provides a microperforated panel absorber 66.

In the panel 66 the secondary sections 68 comprise a first pair of core structures 70 and a second pair of core structures 72. The core structures 70 and the core structure 72 are of different thicknesses and again include a non-perforated backing (See FIGS. 3a and 3b). More particularly, the first pair 70 provides a cell depth of about 50% of the panel thickness. The second pair 72 provides a cell depth of about 25% the panel thickness. With the primary depth "tuned" to 500 Hz as intended, the secondary depths of ½ and ¼ pickup higher frequency absorption. This is considered to improve both the weighted sound absorption coefficient and the noise reduction coefficient.

FIG. 8 illustrates the cell depth along the panel 66. As shown, the cell depth varies according to the series 1, 0.25, 1, 0.5, 1, 0.5, 1, 0.25, 1. With a total panel length of 2400 mm and the second section 34 being 150 mm wide, the zones vary across the panel in lengths of about 360 mm, 150 mm, 360 mm, 150 mm, 360 mm, 150 mm, 360 mm, 150 mm, and 360 mm. Various bands of different cell depths are provided across the panel. The area occupied by the bands of reduced depth is approximately 25% of the total panel facing area (i.e. $(150*4)/((2400))$.

The cells associated with the first zones 74 have a depth of 40 mm and are associated with a resonant frequency of 500 Hz. The cells associated with the second zones 76 have depths of 10 mm and 20 mm and are associated with higher resonant frequencies. As described, the panel 66 provides four second sections 68, a first pair 70 of the second sections 68 being a quarter the thickness of the core and the second pair 72 being half the thickness of the core. The groups of the larger cell depths are located towards the centre of the panel 66.

FIG. 9 illustrates the performance of the panel 66 in comparison to a comparable panel absorber 78, of constant cell depth. Both the panel 66 and the panel 78 have a primary cell depth of 40 mm. In the panel 66 the secondary cells replace about one quarter of the primary cells of the comparable panel absorber 78.

The chart of FIG. 9 is considered to detail a number of observables. Firstly, the panel 66 has the same peak frequency 80 absorption of 500 Hz. Secondly, the frequency absorption between half the peak frequency and the peak frequency is substantially maintained as illustrated by line 82. This is in comparison to the same panel having only primary cells of a first depth. Thirdly, at frequencies between the peak frequency and four times the peak frequency there is a substantial increase in absorption as indicated by line 84 and line 86. At four times the peak frequency (i.e. 2000 Hz) there is a significant increase 67 in the absorption.

As can be seen from FIG. 9 the sum of the sound absorption coefficients at the peak frequency and half peak frequency is slightly greater than the sum of the same panel having only primary cells of a first depth. Notably the peak frequency coefficient exceeds 1 in the FIG. 9. This is because the standard test applied particular standards and corrections, as in known in panel testing.

Moreover, the sum of the sound absorption coefficients at half the peak frequency, the peak frequency, double the peak frequency, and four times the peak frequency is substantially increased.

As is known the NRC value comprises an average of how absorptive a material is at 250, 500, 1000 and 2000 Hz.

FIG. 9 illustrates an improvement of the NRC value from 0.5 to 0.6. The provision of a microperforated absorber panel having an NRC of 0.6 is considered to be advantageous.

The sound absorption coefficients from half the peak frequency to the peak frequency are substantially maintained. The sound absorption coefficients from the peak frequency to 4000 Hz are substantially increased. Values of the various coefficients are illustrated in FIG. 9.

Thus the number of the primary cells 33 and the number of the secondary cells 37 ensures that sound absorption between half the peak frequency and the peak frequency is substantially maintained and that the sound absorption between the peak frequency and 4000 Hz is substantially increased in comparison to the same panel having only primary cells.

Notably if the sections 34 of ¼ thickness are replaced with ½ thickness panels (as in the panel 22), the increase 67 at four times the peak frequency is not as pronounced. Providing a cell 25% of the primary cell depth and a cell depth 50% of the primary cell depth is considered to be advantageous. The cells of reduced 50% depth occupy a similar total area as the cells of the reduced 25% depth.

The panel 66 is considered to provide relatively broad frequency absorption characteristics while advantageously substantially maintaining peak frequency and low frequency absorption. The reduced cell depth areas provide about one quarter of the total panel front sheet area. Other embodiments may of course provide a different coverage area. The secondary cells face onto the front sheet and cover an area equal to about one quarter of the outwardly facing surface area of the front sheet.

Figure 10:
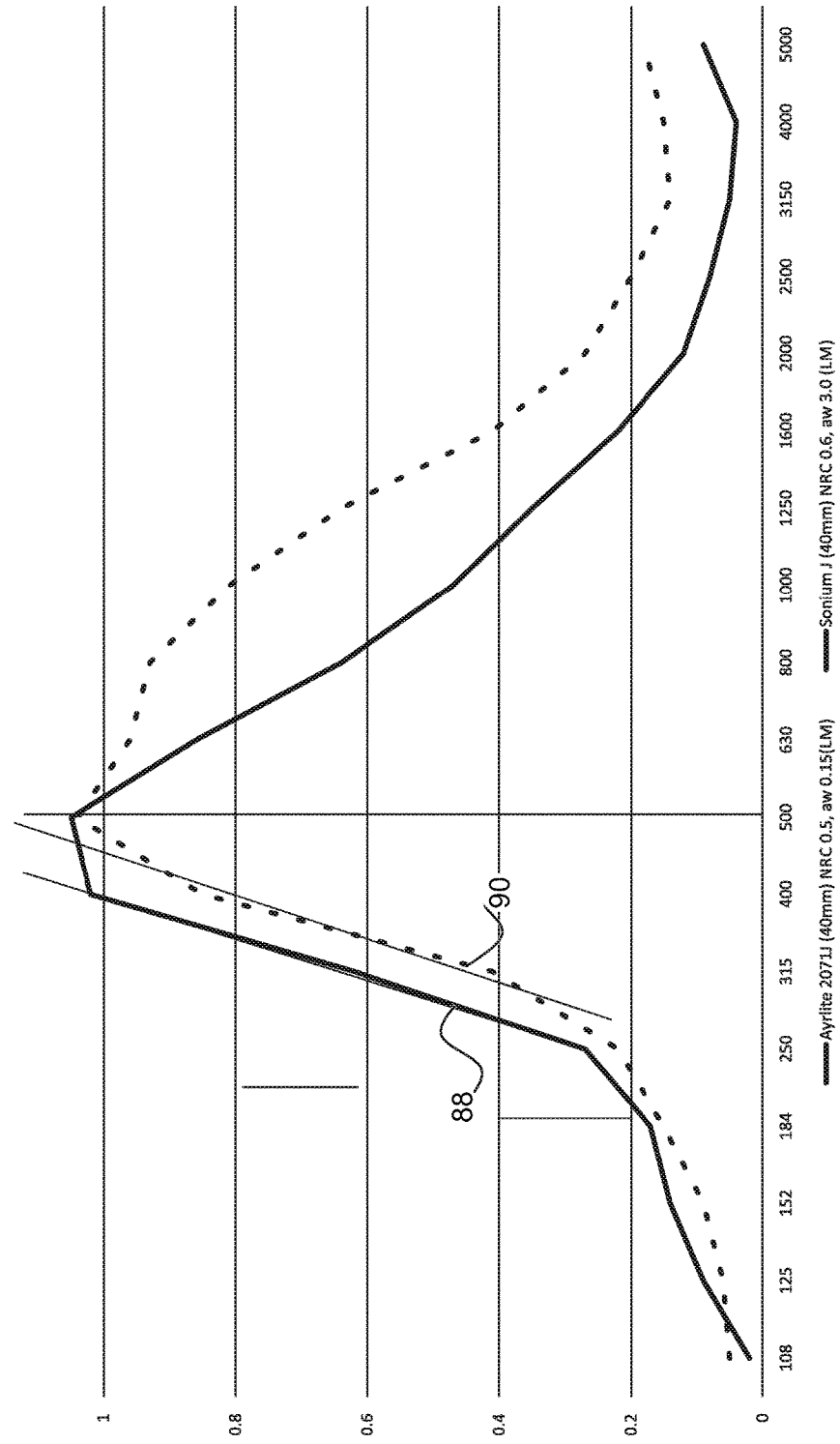
FIG. 10 provides a chart illustrating a presently non-preferred microperforated panel absorber according to another embodiment.

FIG. 10 illustrates the performance of a panel similar to the panel 66 where the width of the second sections 34 are doubled to 300 mm each, two of them having a reduced depth of 20 mm, the other two having reduced depth of 10 mm. As shown, the noise reduction coefficient is increased from 0.5 to 0.6 and the weighted sound absorption coefficient is doubled from 0.15 to 0.3. There is a significant increase in higher frequency absorption, much exceeding a small decrease of absorption between half the peak frequency and the peak frequency as illustrated by the line 88 and the line 90.

The panel 66 provides a microperforated panel having a microperforated panel facing 92 and a core structure 94. The core structure 94 provides cells 96 of a first cell depth and cells 98 of two second cell depths. The first cell depth provides for absorption of low frequencies. The two second cell depths are less than the first cell depth and provide absorption of higher frequencies.

The cells 98 of the at least one second cell depth provide a backing to the panel facing 92 that spans an area equal to about one quarter the outwardly facing area of the panel facing 92. As would be apparent the sections 68 occupy an area adjacent the reverse of the panel facing 92 (one quarter the size thereof) that is abutted by the cells 96. Other embodiments may occupy a larger or smaller area of the total forward facing area of the panel facing 92.

The cells 96 of the first depth are provided by a continuous section of the core 100 that provides spaced apart recesses 102. The cells of the shallower depths are provided by secondary sections 68 that are embedded into the continuous section of the core 100.

The cells 96 of the first depth are provided by the first zone portions 74 of the core 100 adjacent the panel facing 92. The cells of the shallower depth are provided by the intervening second zone portions 76. The first zone portions 74 comprise the thicker portions of the core section 100 and are separated by a number of joining portions 104 of the core 100. The joining portions 104 are provided rearward of the recesses 102, and in the embodiment do not provide sound absorption.

Figure 11:
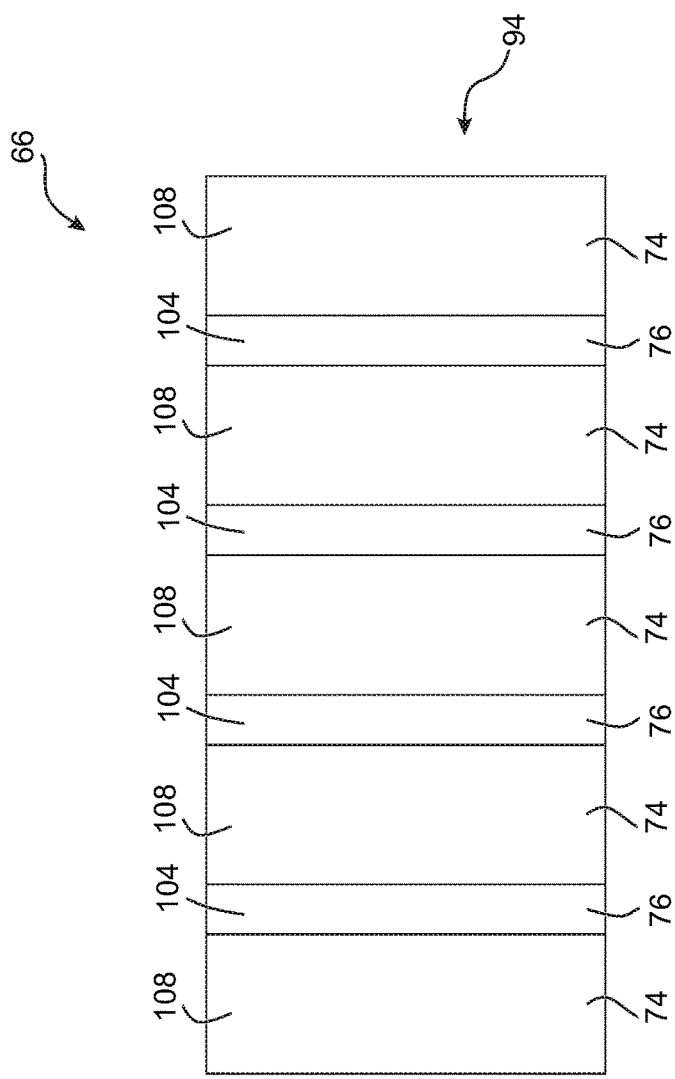
FIG. 11 provides a front schematic view of the microperforated panel absorber shown in FIG. 7.

Referring to FIG. 11 the first zone portions 74 are provided as first zone strips 108 (areas) and the second zone portions 74 are provided as second zone strips 104 (areas). The first zone strips 108 and the second zone strips 108 each extend across the panel (vertically) within the core 108.

In the embodiment the second sections 68 are accommodated by crushing portions of the first section 100 to provide the recesses 102. In other embodiments the second sections 34 are accommodated by cutting out portions of the first section 100 to provide the recesses 102.

Figure 12:
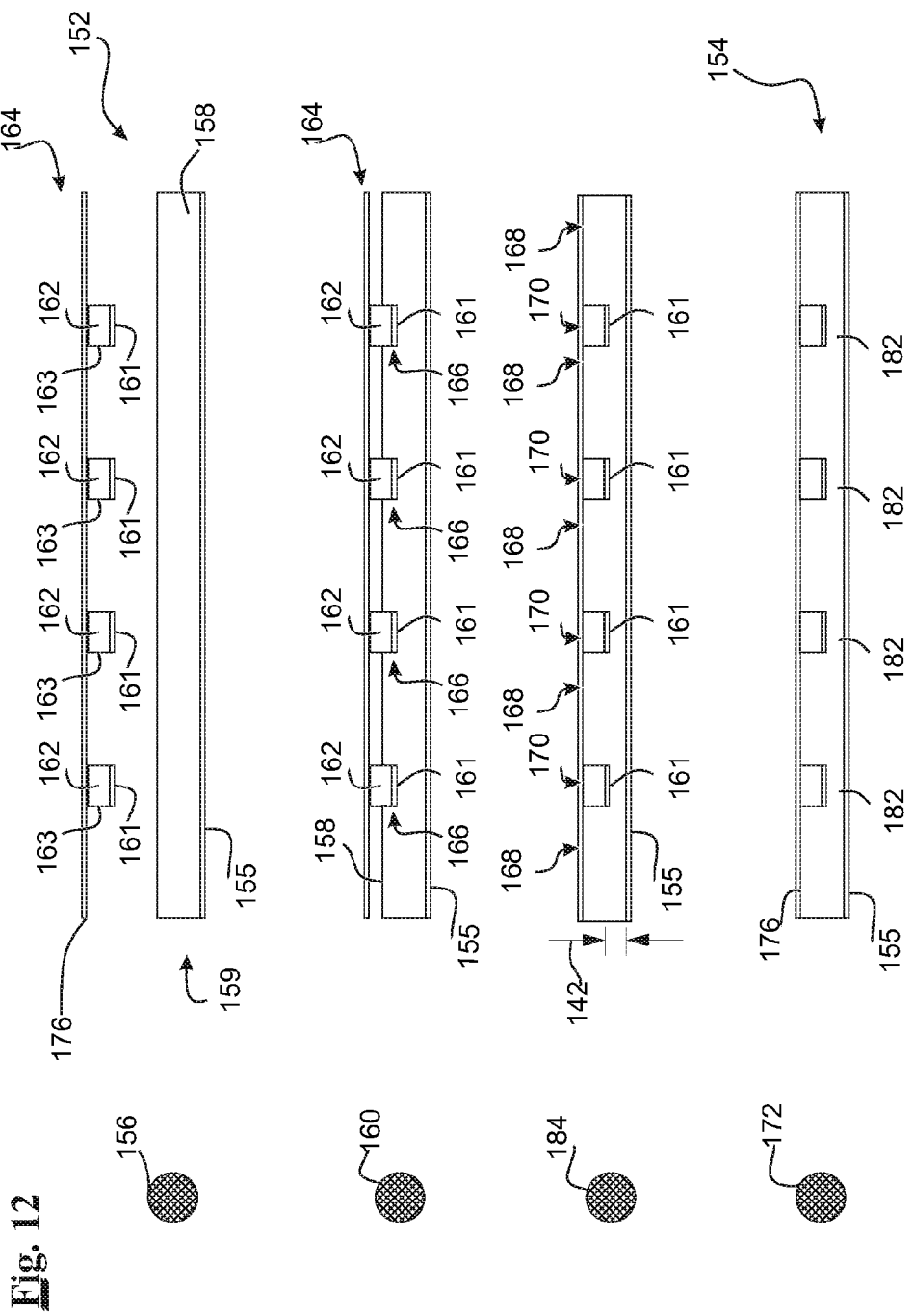
FIG. 12 provides a schematic view of a method according to another preferred embodiment of the present invention.

Referring to FIG. 12 there is shown a method 152 according to another preferred embodiment. The method 152 provides a microperforated panel absorber 154 according to a preferred embodiment in itself.

At block 156 the method 152 includes fixing a non-perforated sheet 155 to a cellular core 158 to provide a first section 159. At block 156 the method 152 includes fixing a non-perforated sheets 161 to a cellular core 163 to provide a plurality of elements 162 in a series 164. This is achieved using adhesive.

At block 160 the method 152 includes forcing the series 164 of elements 162, together with a microperforated sheet, downwardly to crush the cellular core 158 of the first section 159 and provide a number of recesses 166. Each of the elements 162 comprises cellular core having a non-perforated backing 161.

At block 184 a number of cells 168 of a first depth are provided by the cellular core 158. A number of cells 170 of a second depth are provided by the elements 162. The cells 168 provide primary cells. The cells 170 provide secondary cells.

In the method 152 the number of the primary cells and the number of the secondary cells ensures that the sound absorption between half the peak frequency and the peak frequency is substantially maintained and that the sound absorption between the peak frequency and 4000 Hz is substantially increased in comparison to the same panel having only primary cells (in other words without elements 162 and without crushing).

At block 172 a microperforated sheet 176 is affixed to the outward surfaces of the primary cells and the secondary cells, opposite the backing plate 155. This is achieved using a core-skin adhesive fixing method. The elements 162 are spaced apart from the microperforated sheet 155.

In the method 152, the elements 162 provide further cellular core having a higher compression strength than the cellular core 158 to allow crushing to occur. Crushed regions 182 are provided behind the elements 162.

The elements 162 themselves contain the cells providing the second cell depths.

As noted each element 162 includes a backing that is used to contact and crush the cellular core 158. The backing provides its own closed end.

Figure 13:
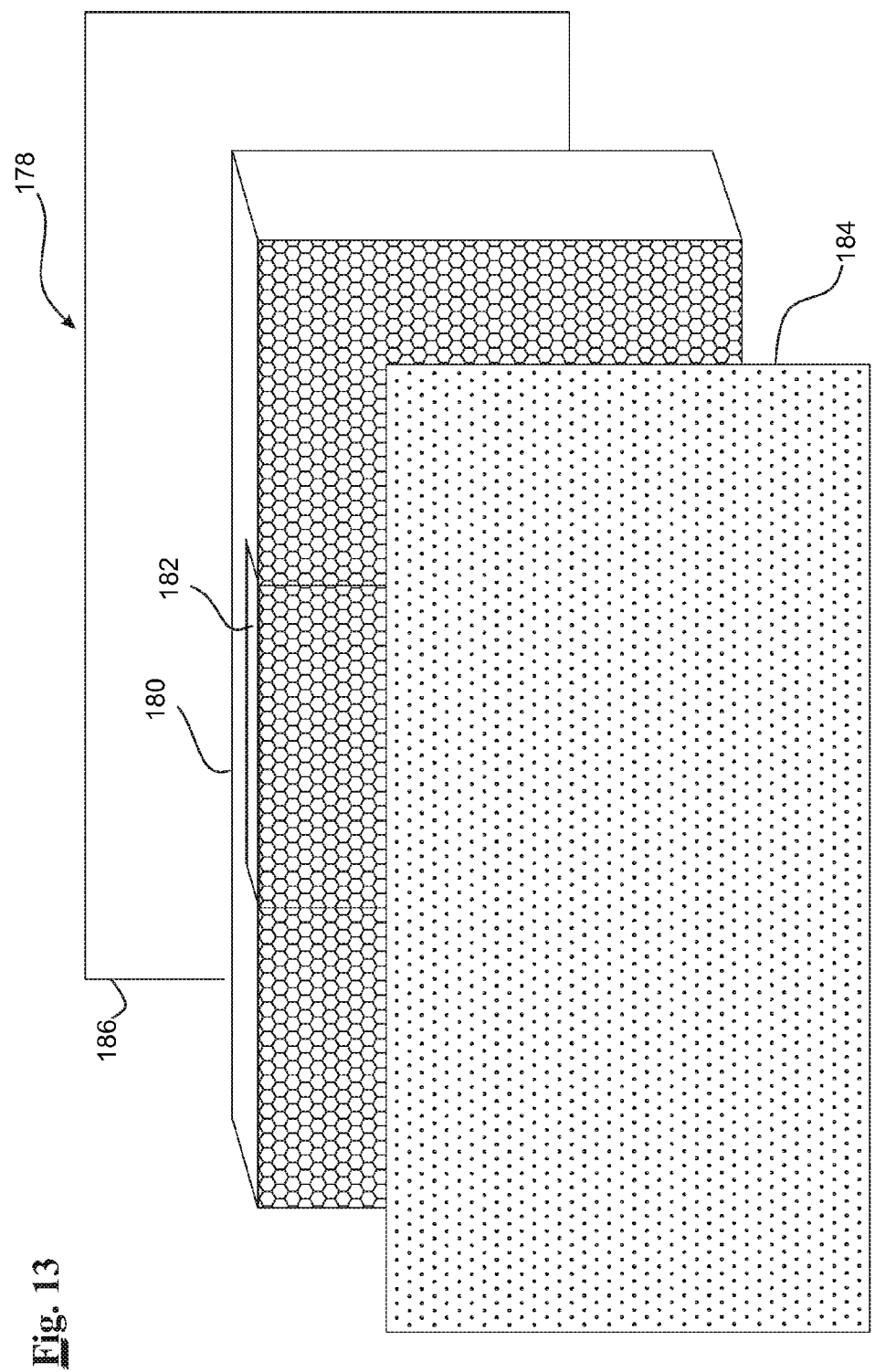
FIG. 13 provides an exploded schematic view of a microperforated panel absorber according to another preferred embodiment.
Figure 14:
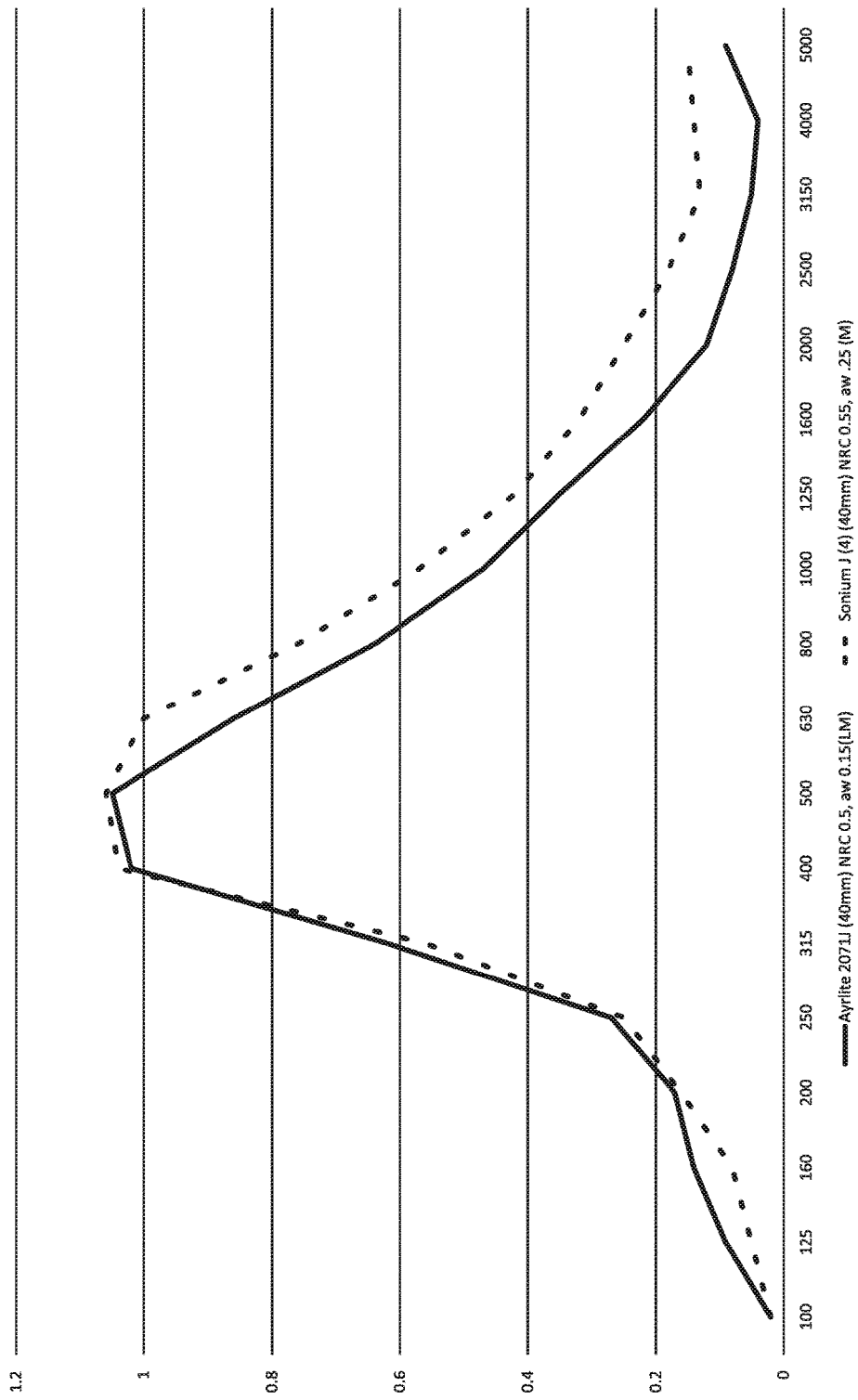
FIG. 14 provides a chart illustrating the performance of the microperforated panel absorber shown in FIG. 13.

Referring to FIG. 13 there is shown a panel 178 according to a further preferred embodiment. The panel 178 includes a single section 180 that provides cells of a primary depth and a central section 182 that provides secondary cells of a reduced depth. The band is centrally positioned on and occupies about ⅓ of the front face of the first core 182. A microperforated sheet 184 provides passages into the cells. A rear sheet 186 provides a backing. When compared to a standard panel the panel 178 provides an advantageous absorption spectrum as shown in FIG. 14. The panel 188 is advantageously easier to make as it provides only a single insert of reduced depth.

Figure 15:
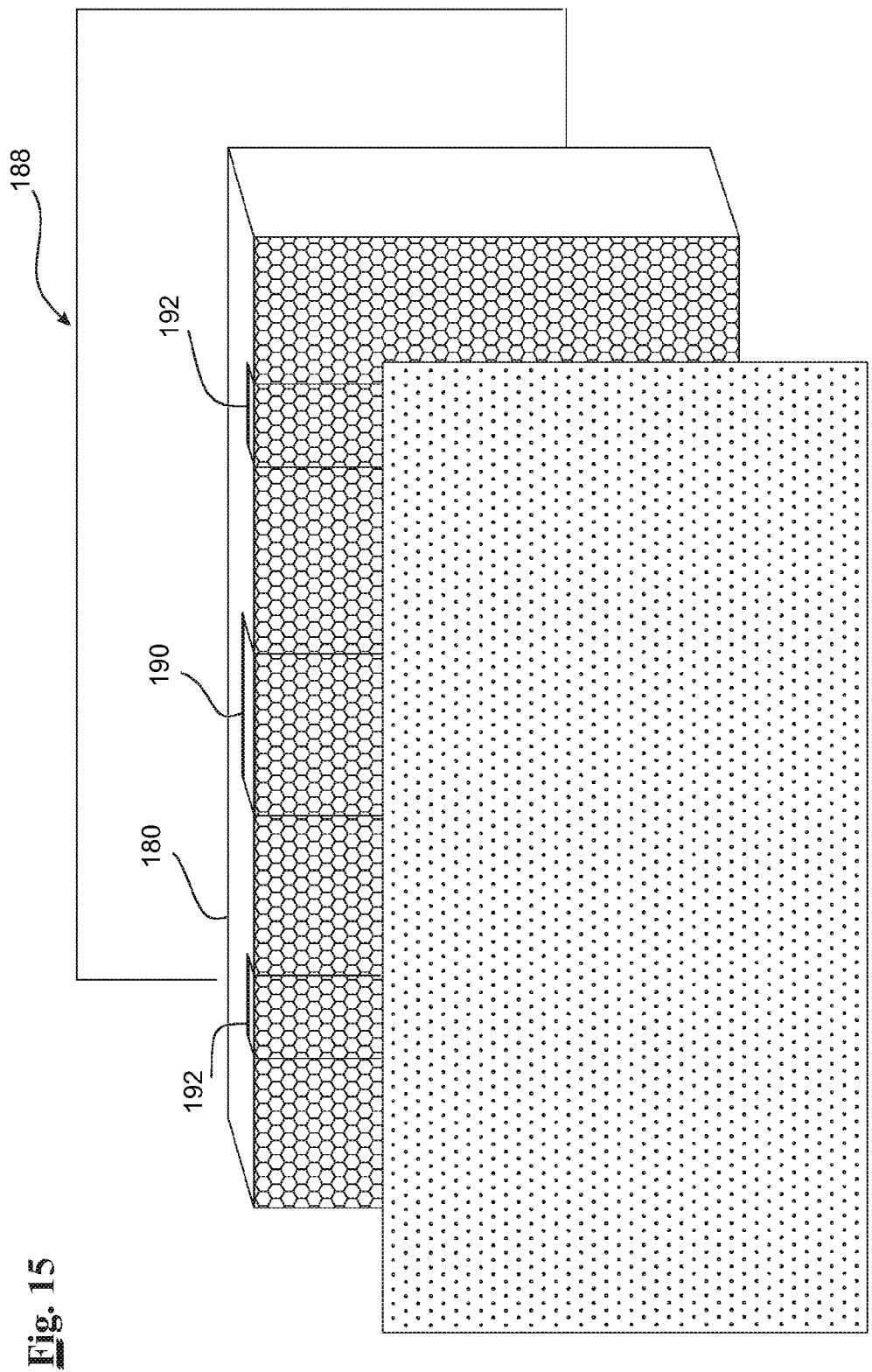
FIG. 15 provides an exploded schematic view of a microperforated panel absorber according to another preferred embodiment.

Referring to FIG. 15 there is shown a panel 188 according to another preferred embodiment. The panel includes a central section 190 of ⅙ the width of the panel and two portions 192 spaced away from the central section 190, each of 1/12 the width of the panel. The three bands provide a backing for ⅓ of the front face of the absorber panel.

In various embodiments it has been seen that a broadening of acoustic absorption across a wider band of frequencies can be provided without greatly reducing low frequency and peak frequency absorption. A substantial proportion of the total surface area of a microperforated honeycomb panel of constant depth (thickness) is provided with one or more areas of shallower depth honeycomb. The resultant panel has a broader frequency absorption while still substantially maintaining advantageous peak and low frequency absorption.

The shallower-depth areas are provided to absorb higher frequencies, to increase the total absorption bandwidth in the manner described. One or more zones of shallower depth are embedded within the same panel.

The depth of the zones of honeycomb panel determines the frequencies that it will absorb. In one embodiment two thirds of the panel is provided with a relatively thick cell depth to absorb low frequencies. Approximately one third of the panel is provided with a relatively thin cell depth to absorb high frequencies. Embodiments provide the advantage of increasing bandwidth in providing a microperforated honeycomb panel acoustic absorber.

The test results were based on full scale ISO 354 testing as opposed to low-cost small-scale impedance tube testing. The results are considered to demonstrate the benefits of arrangements in which the provision of shallower-depth zones provide higher frequency absorption and in various embodiments, higher overall absorption.

By the process of embedding shallower-depth areas within the panel, the weighted sound absorption coefficients are significantly increased (doubled). Noise Reduction Coefficients are also increased. This in effect broadens the waveband of frequencies absorbed, to add higher frequencies. Advantageously, this increased absorption of higher frequencies is achieved without excessive loss of absorption at low and peak frequencies. Low-frequency absorption (below a peak frequency of 500 Hz) is considered to be invaluable, being difficult to achieve with conventional fibrous acoustic materials. Advantageously low-frequency absorption is not significantly eroded. The shallower depth zones could be provided over up to half of the surface area, working in combination with the thicker depth zones of the microperforated honeycomb panel.

In one embodiment four shallower-depth areas are provided. The shallower-depth areas are themselves comprised of honeycomb, bonded to an intermediate backing sheet. The shallower-depth areas provide ¼, ½, ½ and ¼ depths (of the total panel thickness). The shallower-depth areas are embedded by crushing into the main honeycomb body, from the upper surface of the main honeycomb body. In another embodiment, areas are routed into the main honeycomb body to accept the shallower-depth structures, instead of embedding by crushing.

The test results show acoustic performance when 4 strips 150 mm×1200 mm of reduced-depth honeycomb were incorporated into 1200×2400×40 mm panels (i.e. ¼ of total panel area). In the embodiment tested, 2 of the strips were 20 mm deep, the other 2 were 10 mm deep. When comparison is made to a panel which had no embedded reduced-depth zones, it has been seen that low and peak frequency absorption is substantially maintained, whereas absorption of higher frequencies is significantly increased.

In another embodiment there is one shallower-depth area. The shallower-depth area can be formed using any suitable material having a flat facing. The shallower-depth area provides ½ depth of the total panel thickness. The suitable material is embedded into the main honeycomb body from the lower surface of the main honeycomb body. In another embodiment, an area is routed into the main honeycomb body to accept the suitable material, instead of embedding by crushing.

The test results show acoustic performance when 1 piece 800×1200×20 mm of shallower-depth honeycomb was incorporated into 1200×2400×40 mm panels (i.e. ⅓ of total panel area). When comparison is made to a panel which has no embedded shallower-depth zones, it can be seen that low and peak frequency absorption is again substantially maintained, whereas absorption of higher frequencies is again significantly increased.

The embodiments described above make provision, in a single unitary panel form, for varying honeycomb cell depths. This is considered to yield increased acoustic absorption bandwidth. In the past there have been provided acoustic absorber panels having a honeycomb core sandwiched between two facing sheets, one facing sheet being microperforated and the other facing sheet having no microperforations. The embodiments are considered to provide a significant improvement in acoustic absorption bandwidth.

In the embodiments that provide the advantage, it is considered that the microperforated honeycomb panels may replace up to approx. ½ of panel area without substantially adversely affecting existing low and peak frequency acoustic absorption results. Preferably, in order to broaden the total acoustic absorption over a wider waveband, while substantially advantageously maintaining lower-frequency and peak frequency absorption, approximately ⅓ of the panel area is provided with shallower-depth areas to absorb higher frequencies.

In another test there was provide a single insert of 10 mm depth occupying ⅓ of total panel area. The NRC increased from 0.5 to 0.55, adding extra absorption at higher frequencies associated with 10 mm cell depth, and doubling weighted sound absorption coefficient from 0.15 to 0.3.

As described shallower-depth areas are preferably created inside the honeycomb core by a number of methods. In one method a secondary honeycomb with higher compression strength, bonded to a secondary backing sheet, is crushed into the front side of the main body of the core. In another method an area is routed out of the front side of the main body of the core, and filled with a secondary honeycomb bonded to a secondary backing sheet. In a further method, non-honeycomb materials having at least one flat facing, are crushed or otherwise introduced into the back side of the main honeycomb body. While a number of embodiments have been described, it is to be appreciated that the number of individual areas of shallower cell depth can vary, as can their actual depth (up to the limit of the main panel thickness). The finished honeycomb panel structure is advantageously manufactured as a single unit. While a honeycomb structure is preferred, cell shapes other than a generally hexagonal shape are possible, such as triangular.

As would be apparent, various alterations and equivalent forms may be provided without departing from the spirit and scope of the present invention. This includes modifications within the scope of the appended claims along with all modifications, alternative constructions and equivalents. For example in various embodiments the first section may be divided into a number of sections, the cells sizes and shapes in the first sections and second sections might vary as may the aperture size.

Furthermore, it is to be appreciated that the preferred embodiments described improve the weighted sound absorption coefficient, rather than solely improving the NRC. In some embodiments the NRC will not be substantially increased in an economic way. In a number of embodiments however, the weighted sound absorption can be readily doubled by the approaches herein described.

Weighted sound absorption coefficient is the primary measure of sound absorption in Europe, whereas NRC is the primary measure of sound absorption in the USA. The difference between these two coefficients is that weighted sound absorption includes performance at 4000 Hz, in addition to the performance at 250, 500, 1000 and 2000 Hz that NRC takes into account.

The weighted sound absorption is not a simple average of 5 figures (unlike NRC, which is just a simple arithmetic average of absorption at 4 different frequencies). The calculation is complex. As detailed on http://www.armstrong-.com/commcelgeu/eu/uk/gb/glossary.asp—"The weighted sound absorption coefficient provides a 'single-number rating' for random incidence sound absorption coefficients determined in accordance with EN ISO 11654. With this method measured values obtained in accordance with EN ISO 20354 are converted into octave bands at 250, 500, 1000, 2000 and 4000 Hz and are plotted on a graph. A standard reference curve is then shifted towards the measured values until a "best fit" is obtained. The derived value of alpha w will vary between 0.00 and 1.00 but is only expressed in multiples of 0.05 e.g. alpha w=0.65'.)"

Figure 16:
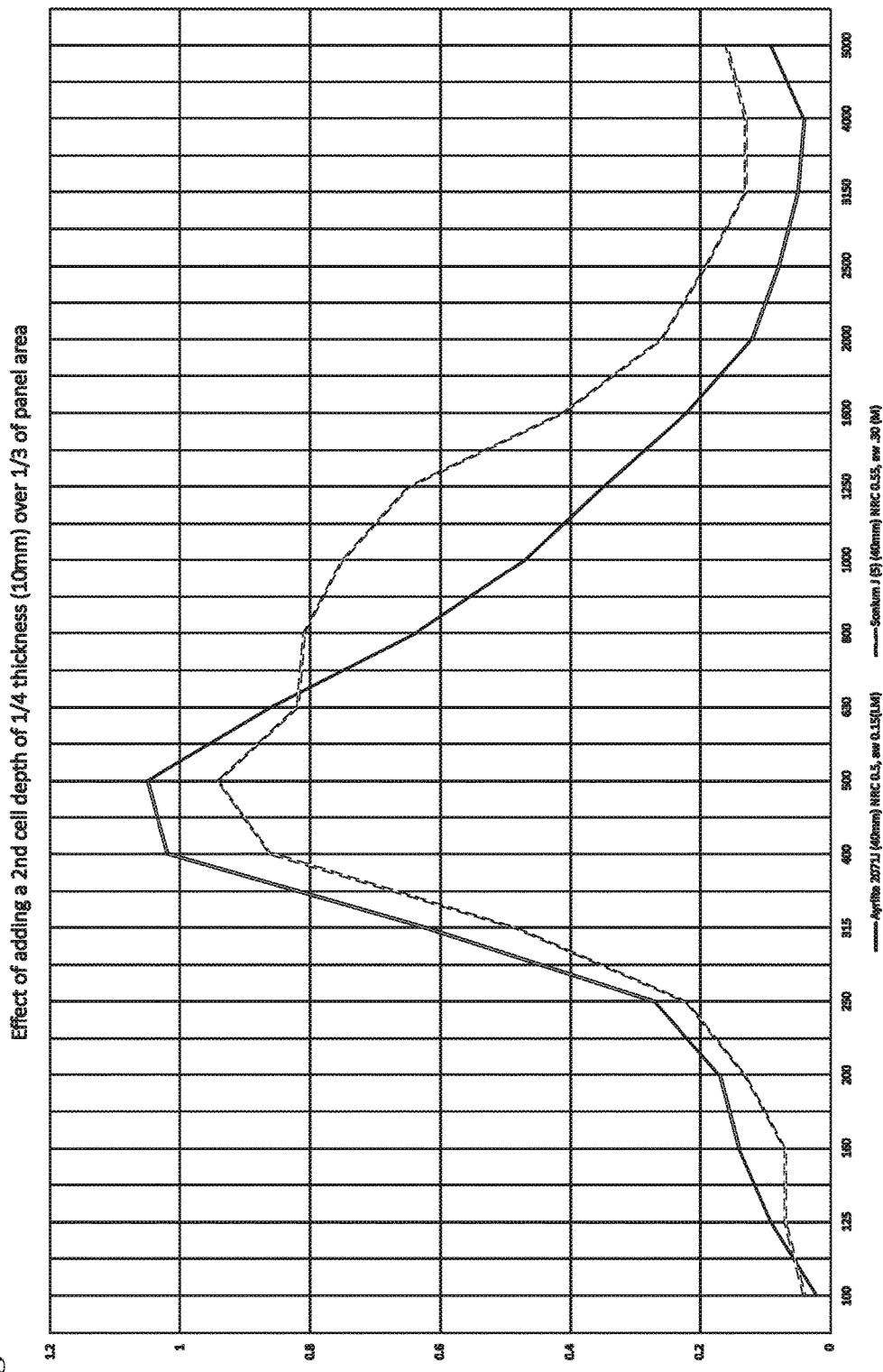
FIG. 16 provides a chart illustrating the performance of a further preferred embodiment.

FIG. 16 illustrates a further preferred embodiment. The embodiment comprises the insertion of a single shallow insert (10×800×1200 mm) into a 40×2400×1200 mm panel. This is considered to double weighted sound absorption coefficient and also to increase NRC. This embodiment is considered to be advantageous for the reason of the increase in the weighted sound absorption average and the increase to the NRC. This is despite the sum of the sound absorption coefficients at half peak frequency and peak frequency being reduced. Low frequency absorption is still relatively substantially maintained at low frequencies.

There is no intention to limit the present invention to the specific embodiments shown in the drawings. The present invention is to be construed beneficially to the applicant and the invention given its full scope.

In the present specification, the presence of particular features does not preclude the existence of further features. The words 'comprising', 'including' and 'having' are to be construed in an inclusive rather than an exclusive sense.

It is to be recognised that any discussion in the present specification is intended to explain the context of the present invention. It is not to be taken as an admission that the material discussed formed part of the prior art base or relevant general knowledge in any particular country or region.

The claims defining the invention are as follows:

1. A method of providing a micro-perforated panel absorber comprising:

providing a primary cellular core having a number of primary cells;

providing secondary cells in a number of recesses, the secondary cells being of reduced depth in comparison to the primary cells; the primary cells providing for absorption of relatively low frequencies; and the secondary cells of reduced depth providing for absorption of relatively high frequencies; and crushing one or more portions of the primary cellular core to provide the number of recesses, wherein the crushing of the primary cellular core and providing the secondary cells is performed using a secondary reduced depth cellular core having a higher compression strength than the primary cellular core that is crushed.

2. The method of providing a micro-perforated panel absorber as claimed in claim 1, wherein the secondary reduced depth cellular core of higher compression strength includes a substantially non-perforated boundary member that contacts and crushes the primary cellular core.

3. The method of providing a micro-perforated panel absorber as claimed in claim 1, wherein the primary cells and the secondary cells are each provided as an array having the cells therein arranged side by side in a regularly repeating manner.

4. The method of providing a micro-perforated panel absorber as claimed in claim 1, wherein the primary cells and the secondary cells are hexagonally shaped and are each provided as a hexagonal array.

5. The method of providing a micro-perforated panel absorber as claimed in claim 1, including affixing a micro-perforated sheet to the outward surfaces of the primary cells and the secondary cells to provide the micro-perforated panel absorber with a micro-perforated front sheet.

\* \* \* \* \*